(12) United States Patent
Senba et al.

(10) Patent No.: US 12,174,610 B2
(45) Date of Patent: Dec. 24, 2024

(54) PROCESSING PROGRAM CREATION DEVICE AND PROCESSING PROGRAM CREATION METHOD

(71) Applicant: AMADA CO., LTD., Kanagawa (JP)

(72) Inventors: Akira Senba, Kanagawa (JP); Jackson Tholath, Chennai (IN); Raj Prasanth Divakaran, Chennai (IN)

(73) Assignee: AMADA CO., LTD., Kanagawa (JP)

( * ) Notice: Subject to any disclaimer, the term of this patent is extended or adjusted under 35 U.S.C. 154(b) by 402 days.

(21) Appl. No.: 17/760,953

(22) PCT Filed: Sep. 8, 2020

(86) PCT No.: PCT/JP2020/033981
§ 371 (c)(1),
(2) Date: Mar. 16, 2022

(87) PCT Pub. No.: WO2021/054204
PCT Pub. Date: Mar. 25, 2021

(65) Prior Publication Data
US 2022/0299978 A1    Sep. 22, 2022

(30) Foreign Application Priority Data

Sep. 21, 2019 (IN) .............................. 201941038166

(51) Int. Cl.
  *G05B 19/4093* (2006.01)
  *B21D 5/02* (2006.01)
  *G06F 16/28* (2019.01)
(52) U.S. Cl.
  CPC ......... *G05B 19/40937* (2013.01); *B21D 5/02* (2013.01); *G06F 16/288* (2019.01); *G05B 2219/49191* (2013.01)

(58) Field of Classification Search
  CPC .... G05B 19/40937; G05B 2219/49191; G06F 16/288; B21D 5/02
(Continued)

(56) References Cited

U.S. PATENT DOCUMENTS 5,828,575 A    10/1998  Sakai
5,971,589 A *  10/1999  Hazama .................. G06T 19/20
                                                      700/165
(Continued)

FOREIGN PATENT DOCUMENTS

EP    0978104 A1    2/2000
EP    2039442 A1    3/2009
(Continued)

OTHER PUBLICATIONS

Extended European Search report for corresponding EP Application No. 20866210.6 issued Oct. 10, 2022.
(Continued)

*Primary Examiner* — Md Azad
(74) *Attorney, Agent, or Firm* — Renner, Otto, Boisselle & Sklar, LLP

(57) ABSTRACT

A topology database generates topology data of a plurality of parts. The topology database acquires processing information including a tool name of a use tool and a processing order from a bending processing program of each part, and stores the processing information in association with the topology data. A processing information acquisition unit searches for a similar part with the same topology data as topology data of a processing target part, and acquires the processing information of the similar part. A tool determination unit calculates a range of a tool length which is able to bend each bending line using a tool with a tool name included in the processing information and which does not interfere with the part, and determines the tool with the tool (Continued)

name and a tool length within a range of the tool length as the use tool.

8 Claims, 20 Drawing Sheets

(58) Field of Classification Search
USPC .......................................................... 700/165
See application file for complete search history.

(56) References Cited

U.S. PATENT DOCUMENTS

| | | |
|---|---|---|
| 6,185,476 B1 | 2/2001 | Sakai |
| 6,219,586 B1 | 4/2001 | Sakai |
| 6,227,022 B1 | 5/2001 | Nagasawa |
| 6,701,208 B2 | 3/2004 | Hwang |
| 8,322,173 B2 | 12/2012 | Senba |
| 2002/0038163 A1* | 3/2002 | Hazama ............... G06V 10/426 |
| | | 700/165 |
| 2003/0045948 A1 | 3/2003 | Hwang |
| 2004/0019402 A1* | 1/2004 | Bourne .................... B21D 5/02 |
| | | 700/165 |
| 2006/0106757 A1* | 5/2006 | Sakai ................. G05B 19/4181 |
| 2009/0308130 A1 | 12/2009 | Senba |
| 2014/0010109 A1* | 1/2014 | Himura ............... H04L 41/0853 |
| | | 370/254 |
| 2020/0218235 A1* | 7/2020 | Kiefer .................... G01S 5/021 |

FOREIGN PATENT DOCUMENTS

| | | |
|---|---|---|
| JP | 2001-265422 A | 9/2001 |
| JP | 2003071520 A | 3/2003 |
| JP | 2008012571 A | 1/2008 |

OTHER PUBLICATIONS

International Search Report for corresponding Application No. PCT/JP2020/033981, mailed Nov. 24, 2020.

Written Opinion for corresponding Application No. PCT/JP2020/033981, mailed Nov. 24, 2020.

* cited by examiner

PROCESSING PROGRAM CREATION DEVICE AND PROCESSING PROGRAM CREATION METHOD

TECHNICAL FIELD

The present disclosure relates to a processing program creation device and a processing program creation method.

BACKGROUND ART

A press brake manufactures a predetermined part by bending a sheet metal based on a bending processing program. When a sheet metal is subjected to bending processing in order for an owner of the press brake to manufacture a part, there may be owner-specific rules or know-how. When a predetermined part is manufactured, it is recommended to refer to the bending processing programs for parts previously manufactured by the owner in order to reflect the owner-specific rules or know-how.

Patent Literature 1 discloses a method of manufacturing a new product by searching for a similar part to a part to be newly manufactured based on topology data of a plurality of previously manufactured parts, and performing bending processing on a sheet metal using a bending processing program for the similar part.

CITATION LIST

Patent Literature

PTL 1: U.S. Pat. No. 5,971,589

SUMMARY OF INVENTION

However, even when a sheet metal is subjected to bending processing using the bending processing program for the similar part selected based on the topology data to manufacture a part, the part may not be actually bent.

An object of one or more embodiments is to provide a processing program creation device and a processing program creation method capable of actually performing bending processing on a part with reference to a bending processing program for a similar part selected based on topology data.

A first aspect of one or more embodiments provides a processing program creation device in which a topology database generates topology data indicating a geometric relationship between surfaces or bending lines of each part of a plurality of parts stored in a processing data management database, acquires processing information including a tool name of a use tool used to perform bending processing on each bending line of a plurality of bending lines of each of the parts and a bending order in which the plurality of bending lines are subjected to the bending processing from a bending processing program stored in the processing data management database and used for the bending processing on each of the parts, and stores the processing information in association with topology data of each of the parts, the processing program creation device including: a processing information acquisition unit configured to search for a similar part with the same topology data as topology data of a processing target part from the topology database, and to acquire the processing information of the similar part; a tool determination unit configured to calculate a range of a tool length which is able to bend each bending line of a plurality of bending lines of the processing target part using a tool with a tool name included in the processing information acquired by the processing information acquisition unit, and which does not interfere with the part, and to determine the tool with the tool name and a tool length within a range of the tool length as the use tool; and a bending processing program creation unit configured to create a bending processing program for performing the bending processing on the plurality of bending lines in a bending order included in the processing information acquired by the processing information acquisition unit using the use tool determined by the tool determination unit.

A second aspect of one or more embodiments provides a processing program creation method in which a topology database generates topology data indicating a geometric relationship between surfaces or bending lines of each part of a plurality of parts stored in a processing data management database, acquires processing information including a tool name of a use tool used to perform bending processing on each bending line of a plurality of bending lines of each of the parts and a bending order in which the plurality of bending lines are subjected to the bending processing by a bending processing program stored in the processing data management database and used for the bending processing on each of the parts, and stores the processing information in association with topology data of each of the parts, by a computing device, searching for a similar part with the same topology data as topology data of a processing target part from the topology database, and acquiring the processing information of the similar part; calculating a range of a tool length which is able to bend each bending line of a plurality of bending lines of the processing target part using a tool with a tool name included in the processing information acquired by the processing information acquisition unit, and which does not interfere with the part, and determining the tool with the tool name and a tool length within a range of the tool length as the use tool; and creating a bending processing program for performing the bending processing on the plurality of bending lines in a bending order included in the processing information using the determined use tool.

The processing program creation device and a processing program creation method according to one or more embodiments are capable of actually performing bending processing on a part with reference to the bending processing program for a similar part selected based on topology data.

DESCRIPTION OF EMBODIMENTS

Figure 1:
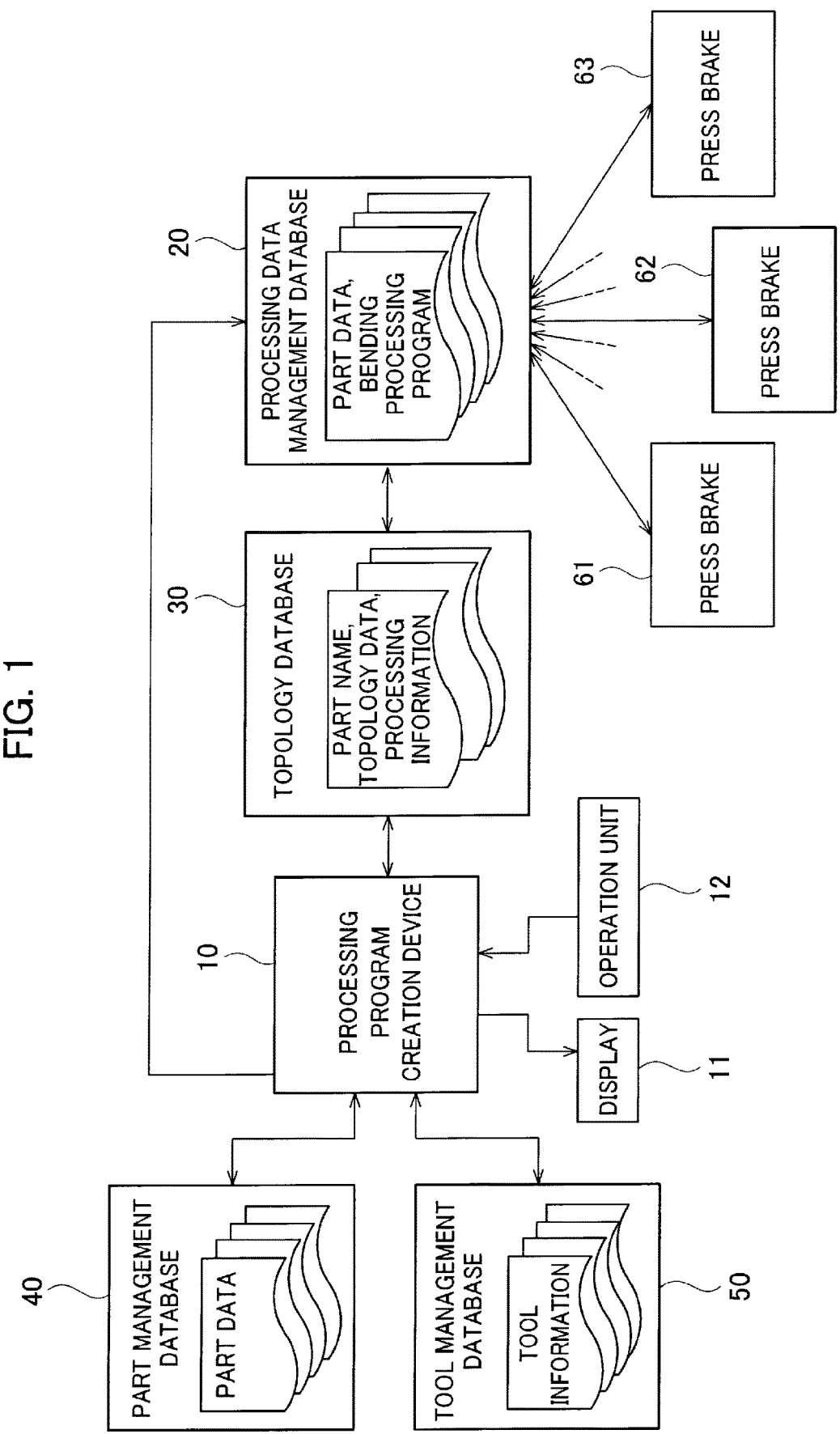
FIG. 1 is a block diagram illustrating a processing system that includes a processing program creation device according to one or more embodiments.

A processing program creation device and a processing program creation method according to one or more embodiments will be described with reference to the accompanying drawings. FIG. 1 illustrates a processing system configured to include a processing program creation device 10 according to one or more embodiments. In FIG. 1, a display 11 and an operation unit 12 are connected to the processing program creation device 10. The processing program creation device 10 can be configured by a computing device including a computer aided manufacturing (CAM) function.

Figure 2A:
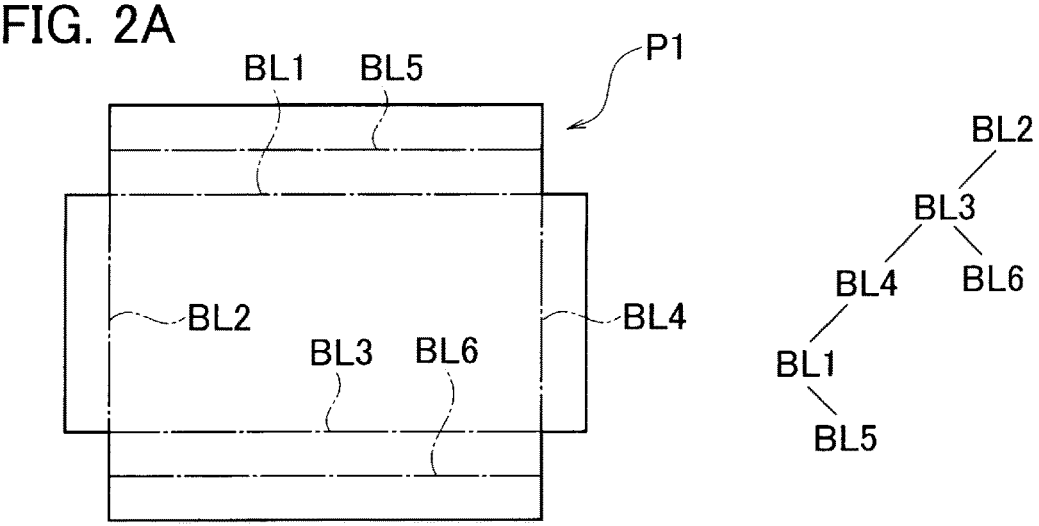
FIG. 2A is a diagram illustrating a part P1 for which part data and a bending processing program are stored in a processing data management database and topology data of the part P1.
Figure 2B:
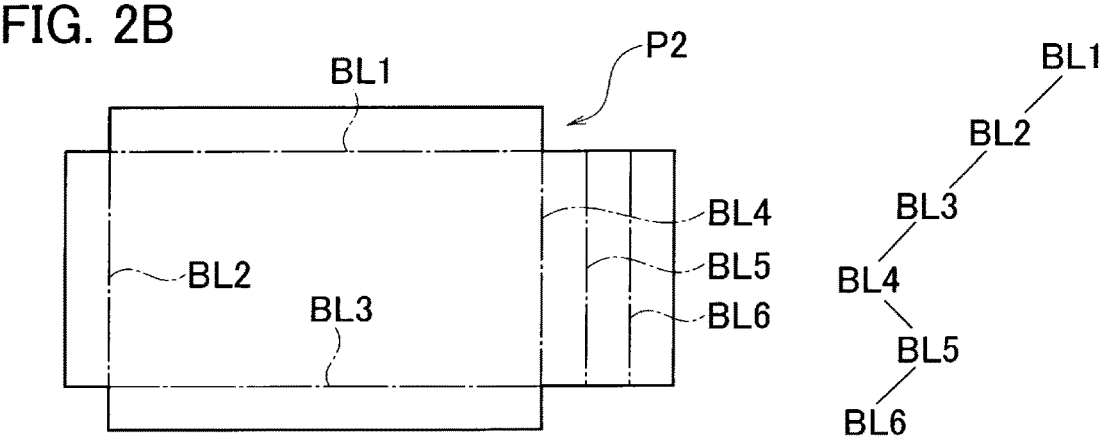
FIG. 2B is a diagram illustrating a part P2 for which par data and a bending processing program are stored in a processing data management database and topology data of the part P2.
Figure 2C:
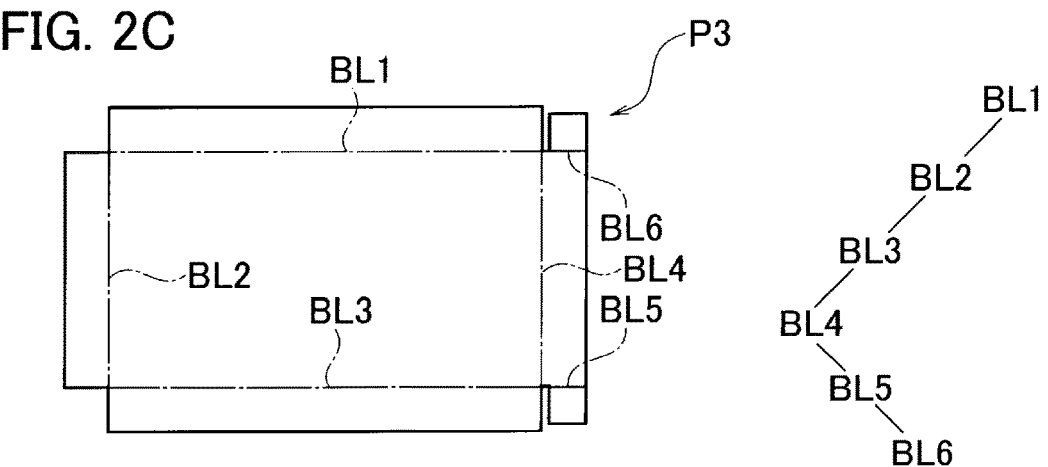
FIG. 2C is a diagram illustrating a part P3 for which part data and a bending processing program are stored in a processing data management database and topology data of the part P3.

A processing data management database 20, a topology database 30, a part management database 40, and a tool management database 50 are connected to the processing program creation device 10. The processing data management database 20 stores a bending processing program for manufacturing parts P1 to P3 in association with each part data of the parts P1 to P3 illustrated in FIGS. 2A to 2C, for example.

Press brakes 61 to 63 and unillustrated other press brakes manufacture parts by performing bending processing on sheet metals using bending processing programs stored in the processing data management database 20.

The topology database 30 generates topology data of each part based on part data of a plurality of parts stored in the processing data management database 20. The topology data is data indicating a geometric relationship between surfaces or bending lines of each part. In examples illustrated in FIGS. 2A to 2C, the parts P1 to P3 have bending lines BL1 to BL6 indicated by one-dot chain lines. The topology database 30 generates topology data indicating a geometric relationship between the bending lines BL1 to BL6, as illustrated to the right of the parts P1 to P3 illustrated in FIGS. 2A to 2C.

The topology database 30 further acquires, as processing information, each piece of information regarding a tool name of a tool used to bend each bending line (a use tool), a tool front/back information, a bending order of a plurality of bending lines, and a butting direction at the time of bending each bending line from the bending processing program for each part. The topology database 30 stores the topology data and the processing information in association with a part name of each part.

The use tool is a pair of a punch and a die. The punch and the die are specified with a tool name. The tool name is a name with which a plurality of tools of which cross-sectional shapes are the same and lengths are different are managed together. The tool name may be expressed with the number of multiple digits, may be expressed in a combination of a number and an alphabet letter, or may be expressed by a plurality of alphabet letters.

Note that the length of a tool is a width in the right and left directions when the tool is mounted on a press brake. A unique tool number is attached to tools with individual lengths included in the same tool name. For the punch, there are types of tools of a standard punch, a gooseneck punch, a sash punch, a straight blade punch, and the like. For the die, there are types of tools of a sash 1V, thick plates 1V and 2V, and the like. The tool front/back information is information for designating whether to use the use tool in a front direction or in a back direction.

Figure 3A:
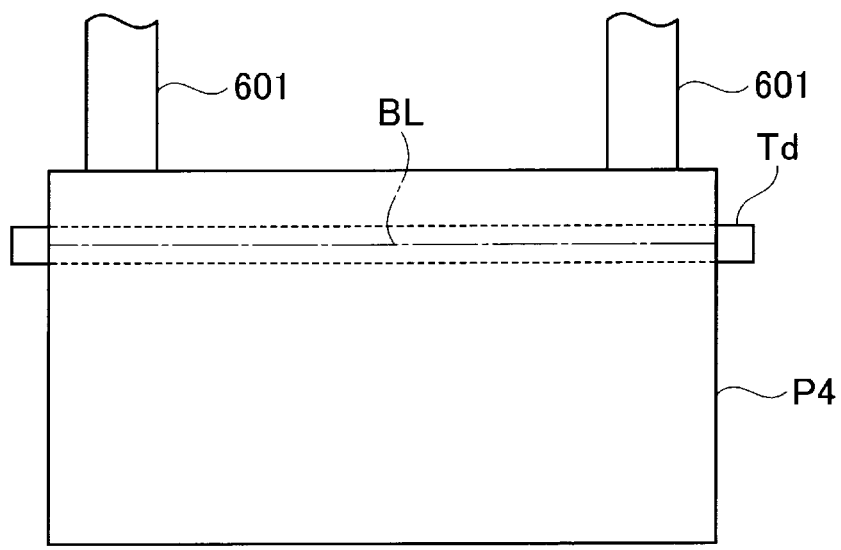
FIG. 3A is a plan view illustrating a first butting direction in which butts of a back gauge are butted against a part P4.
Figure 3B:
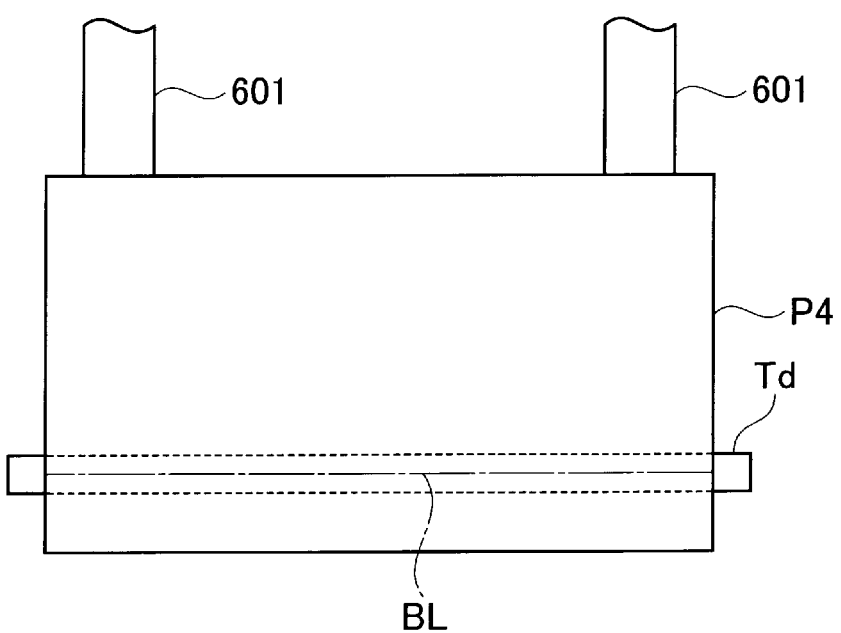
FIG. 3B is a plan view illustrating a second butting direction in which butts of a back gauge are butted against the part P4.

The butting direction is a direction in which butts of a back gauge are butted against each part when each bending line is subjected to bending processing and, in other words, indicates a side of a part against which the butts are butted. FIGS. 3A and 3B illustrate two butting directions when a bending line BL of the part P4 is bent. The part P4 can be bent along the bending line BL by placing the part P4 on a die Td, pressing the tip of an unillustrated punch along the bending line BL, and pushing the punch toward the die Td. At this time, butts 601 of the back gauge are butted against the back end of the part P4.

FIG. 3A illustrates a first butting direction in which the side close to the bending line BL is located on the back side of the press brake and the butts 601 are butted. FIG. 3B illustrates a second butting direction in which the side away from the bending line BL is located on the back side of the press brake and the butts 601 are butted.

The topology database 30 may acquire only a tool name of the use tool and a bending order of a plurality of bending lines as processing information. In this case, the topology database 30 stores processing information such as the topology data, the tool name, and the bending order in association with a part name of each part.

The part management database 40 stores part data of various parts subjected to bending processing by the bending processing program created by the processing program creation device 10. The tool management database 50 stores various kinds of tool information to be used when sheet metals are subjected to bending processing. The tool information includes information such as a tool number, distinction between a punch and a die, a tool name, a type of tool, a length of the tool, a height of the tool, an angle of the tip of a punch, and a width (V width) of a V-shaped groove of the die.

Figure 4:
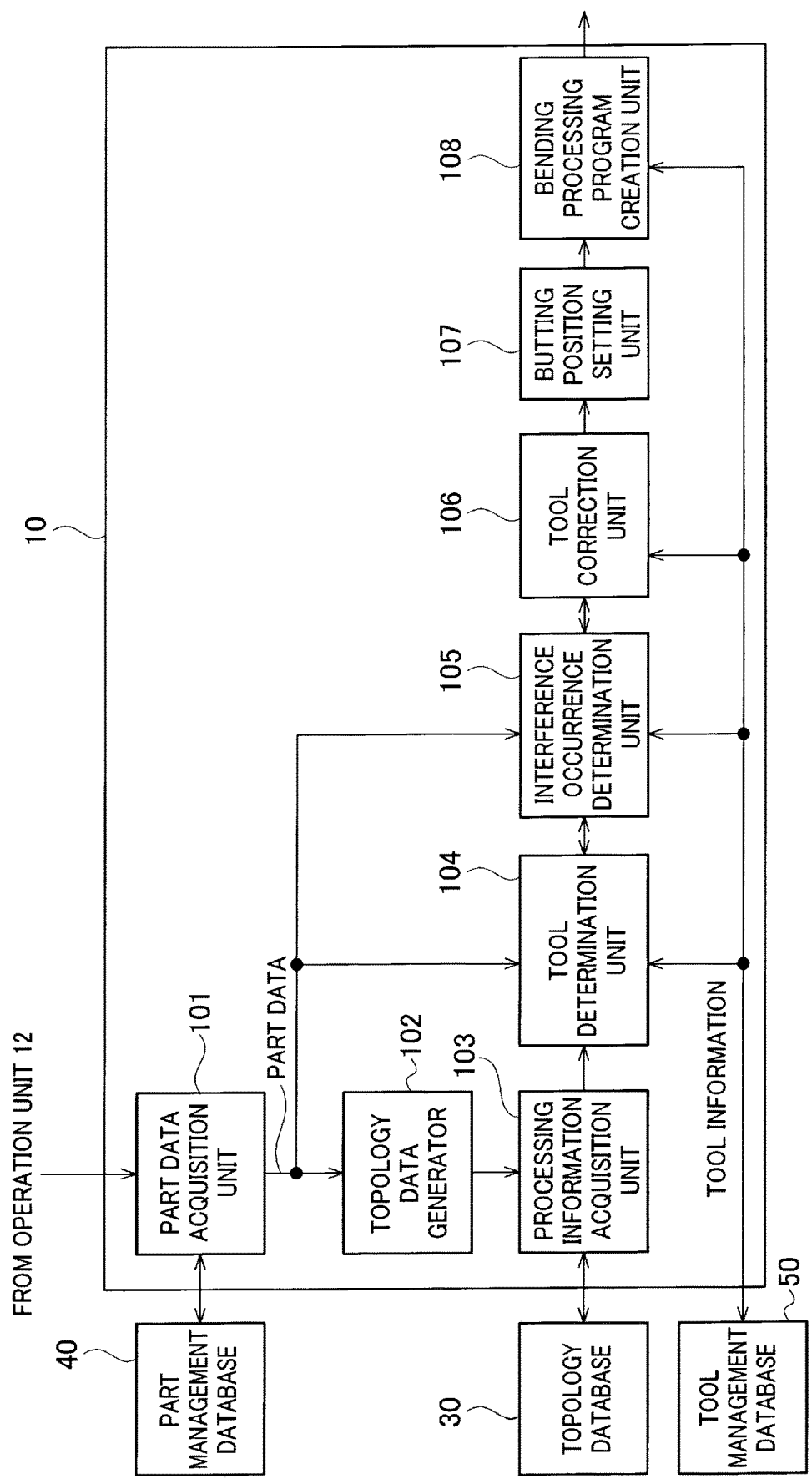
FIG. 4 is a block diagram illustrating a configuration example of a processing program creation device according to one or more embodiments.

FIG. 4 illustrates a functional internal configuration example of the processing program creation device 10. The processing program creation device 10 includes a part data acquisition unit 101, a topology data generator 102, a processing information acquisition unit 103, a tool determination unit 104, an interference occurrence determination unit 105, a tool correction unit 106, a butting position setting unit 107, and a bending processing program creation unit 108. The functional configuration of the processing program creation device 10 illustrated in FIG. 4 can be configured by causing a computing device to execute a CAM program.

Figure 5:
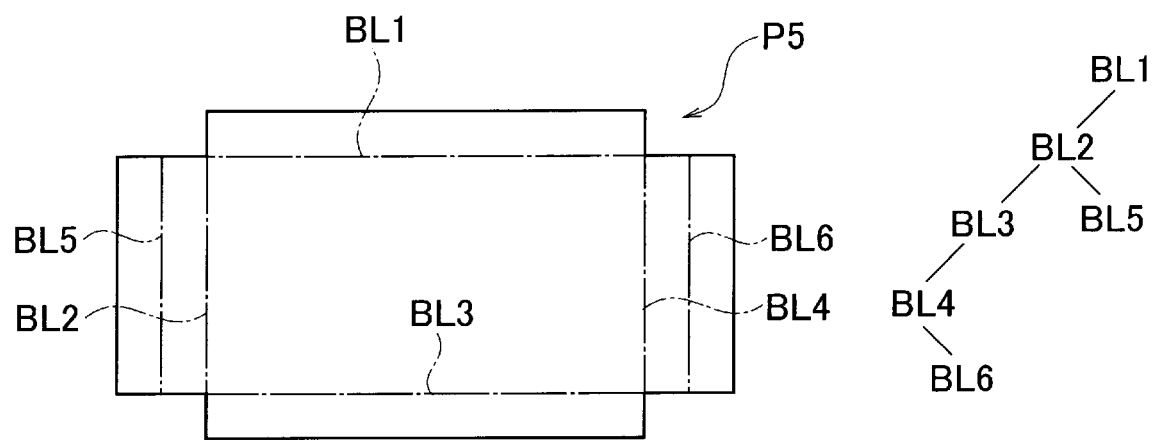
FIG. 5 is a diagram illustrating a part P5 which is an example of a processing target part and topology data of the part P5.
Figure 6A:
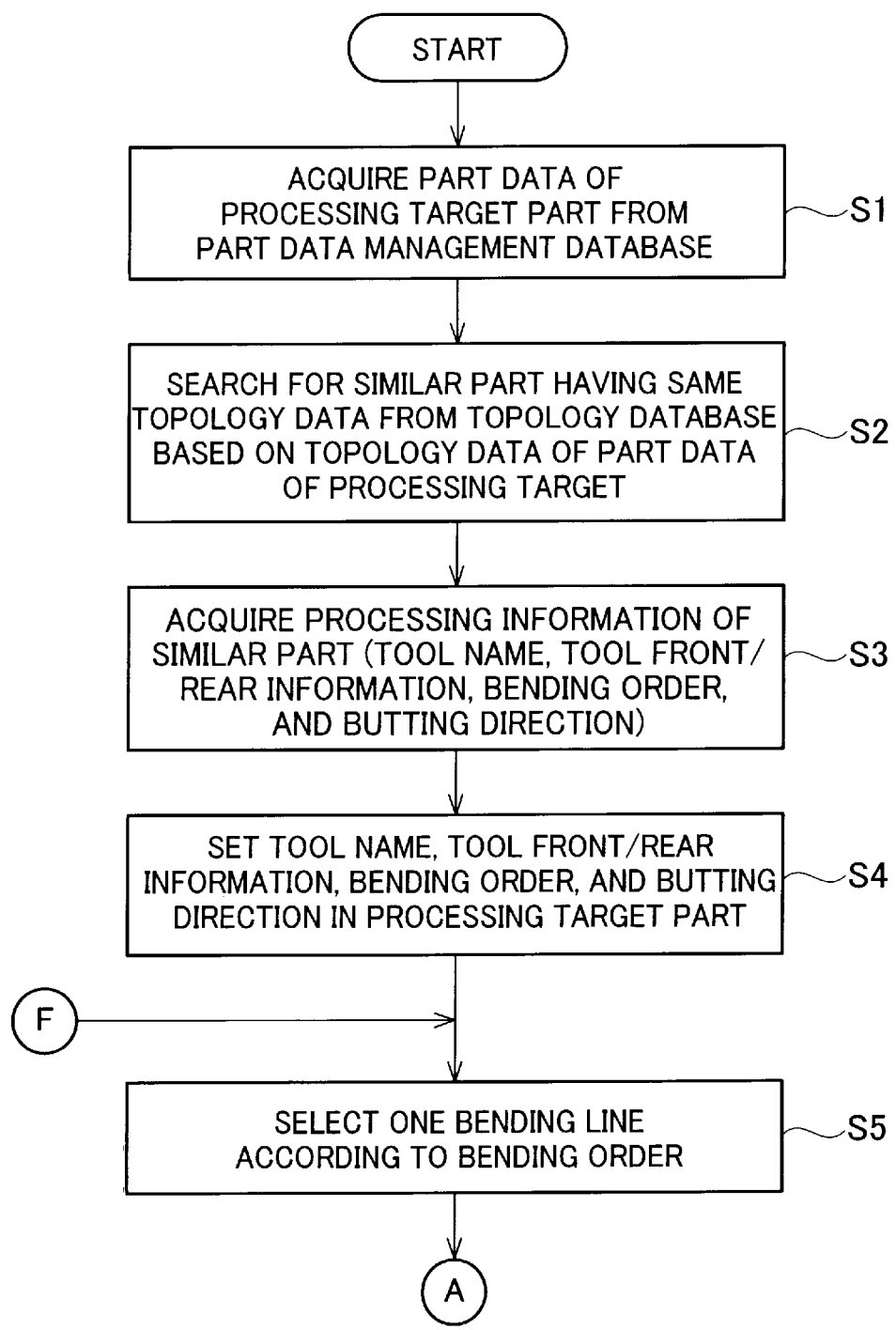
FIG. 6A is a partial flowchart illustrating a process performed by the processing program creation device according to one or more embodiments, and a processing program creation method according to one or more embodiments.

A procedure in which the processing program creation device 10 creates a bending processing program will be described with reference to the flowcharts illustrated in FIGS. 6A to 6D. In FIG. 6A, in step S1, the part data acquisition unit 101 acquires part data of a processing target part from the part management database 40. For example, the part P5 illustrated in FIG. 5 is set as a processing target part. The processing target part P5 is instructed by the operation unit 12. In step S2, the topology data generator 102 generates topology data of the part P5 and supplies the topology data to the processing information acquisition unit 103. In FIG. 5, topology data illustrated to the right of the part P5 is generated.

In step S2, the processing information acquisition unit 103 searches for a similar part that has the same topology data as the input topology data from the topology database 30. The topology data of the part P5 illustrated in FIG. 5 is identical to the topology data of the part P1 illustrated in FIG. 2A. Thus, in step S2, the processing information acquisition unit 103 extracts the part P1 stored in the topology database 30 as the similar part.

In step S3, the processing information acquisition unit 103 acquires the tool name, the tool front/back information, the bending order, and the butting direction of the use tool which are the processing information of the part P1 which is the similar part. As described above, in step S3, the processing information acquisition unit 103 may acquire only the tool name and the bending order of the use tool as the processing information of the part P1. In step S4, the processing information acquisition unit 103 sets the tool name, the tool front/back information, the bending order, and the butting direction for the processing target part P5. In step S4, the processing information acquisition unit 103 may set only the tool name and the bending order in the processing target part P5. In step S5, the tool determination unit 104 selects one bending line according to the bending order.

Figure 6B:
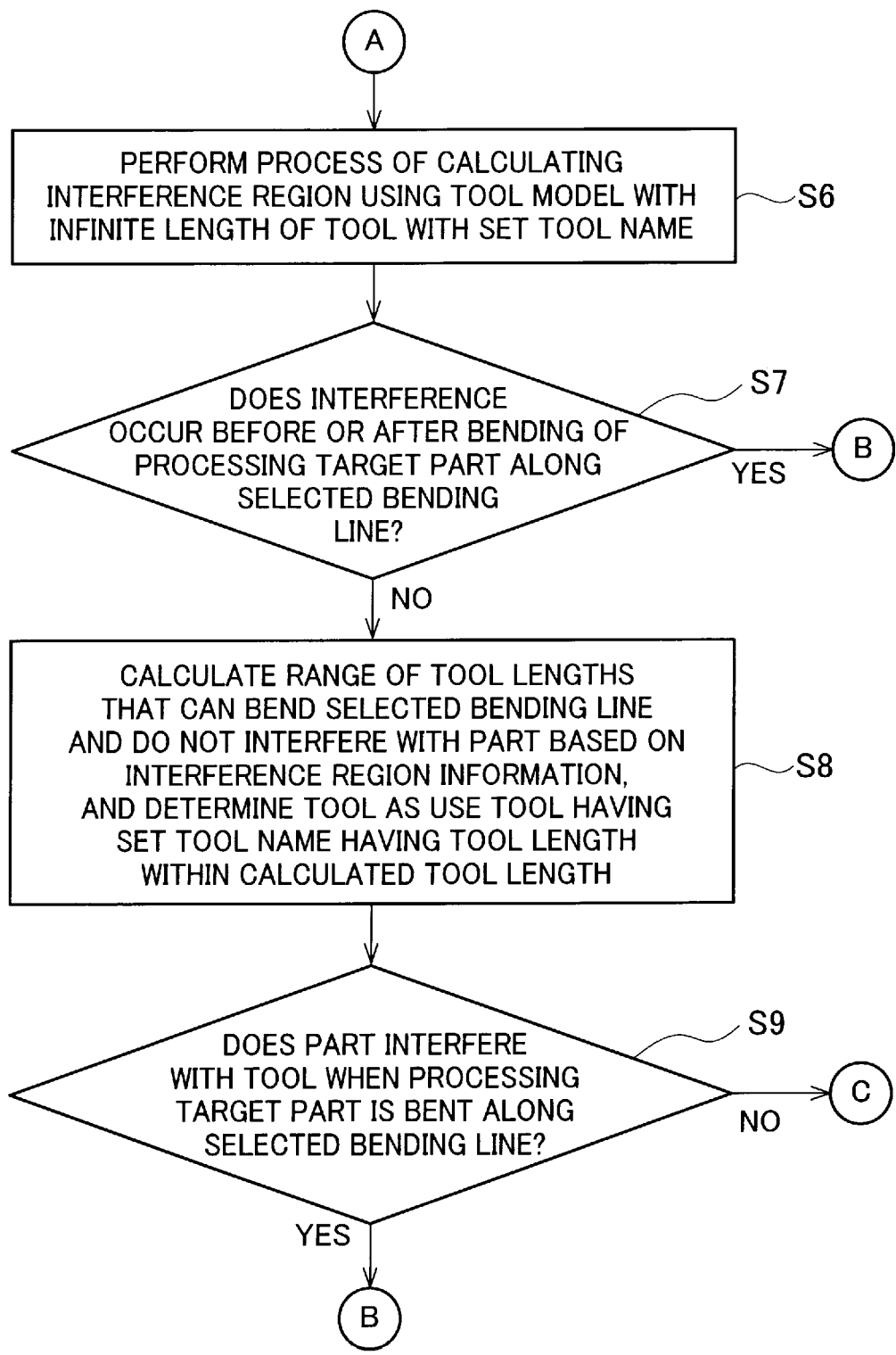
FIG. 6B is a partial flowchart illustrating a process performed by the processing program creation device according to one or more embodiments, and a processing program creation method according to one or more embodiments following the flowchart of FIG. 6A.
Figure 6C:
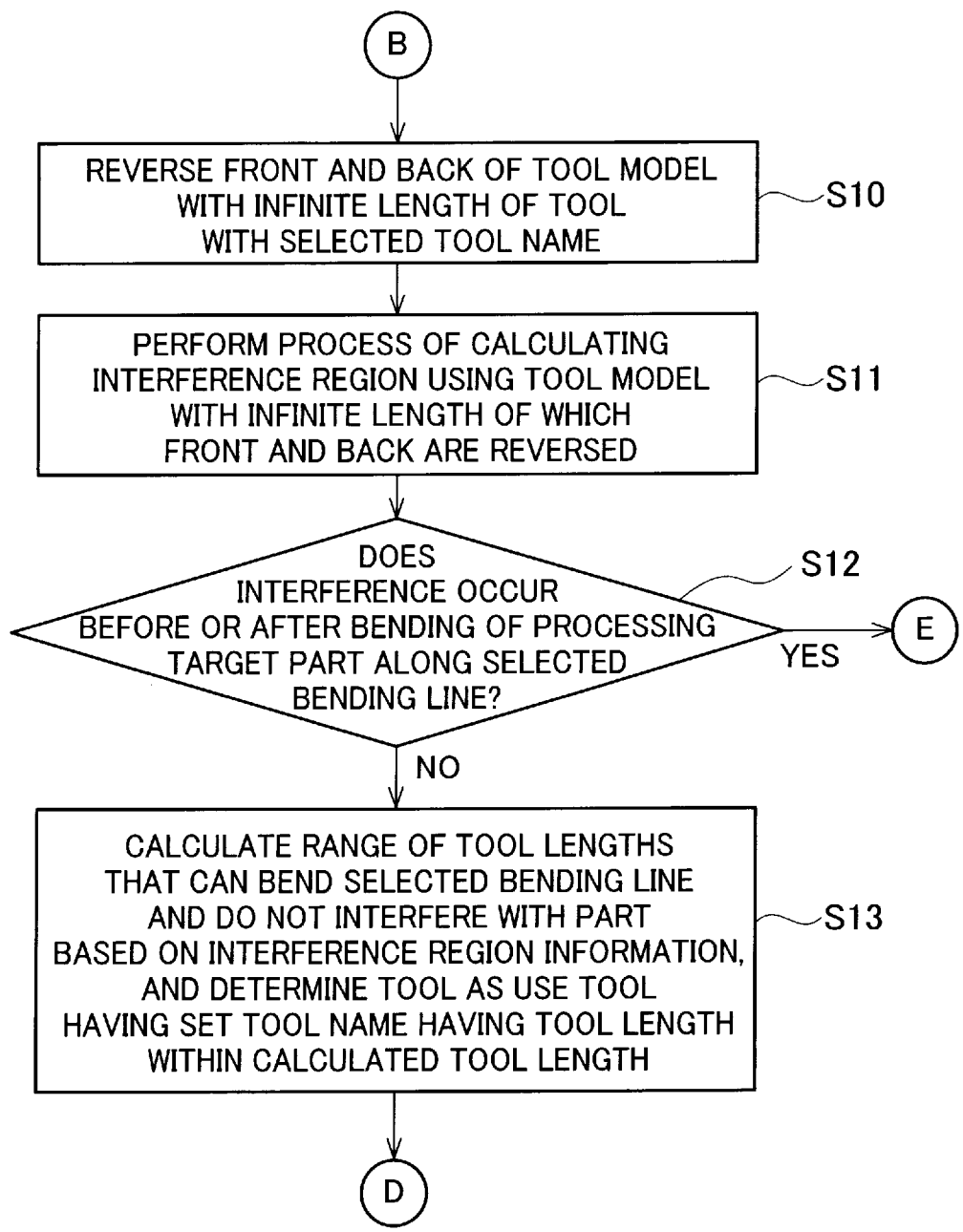
FIG. 6C is a partial flowchart illustrating a process performed by the processing program creation device according to one or more embodiments, and a processing program creation method according to one or more embodiments following the flowchart of FIG. 6B.

In step S6 of FIG. 6B, the tool determination unit 104 performs a process of calculating an interference region using a tool model with an infinite length of the tool with the set tool name. At this time, the tool determination unit 104 performs the process of calculating the interference region using the part data acquired by the part data acquisition unit 101. Here, the mold model with an infinite length is used, but in the process of calculating the interference region, it is only necessary to consider bending the part using a tool having a length exceeding the size of the part.

Figure 7:
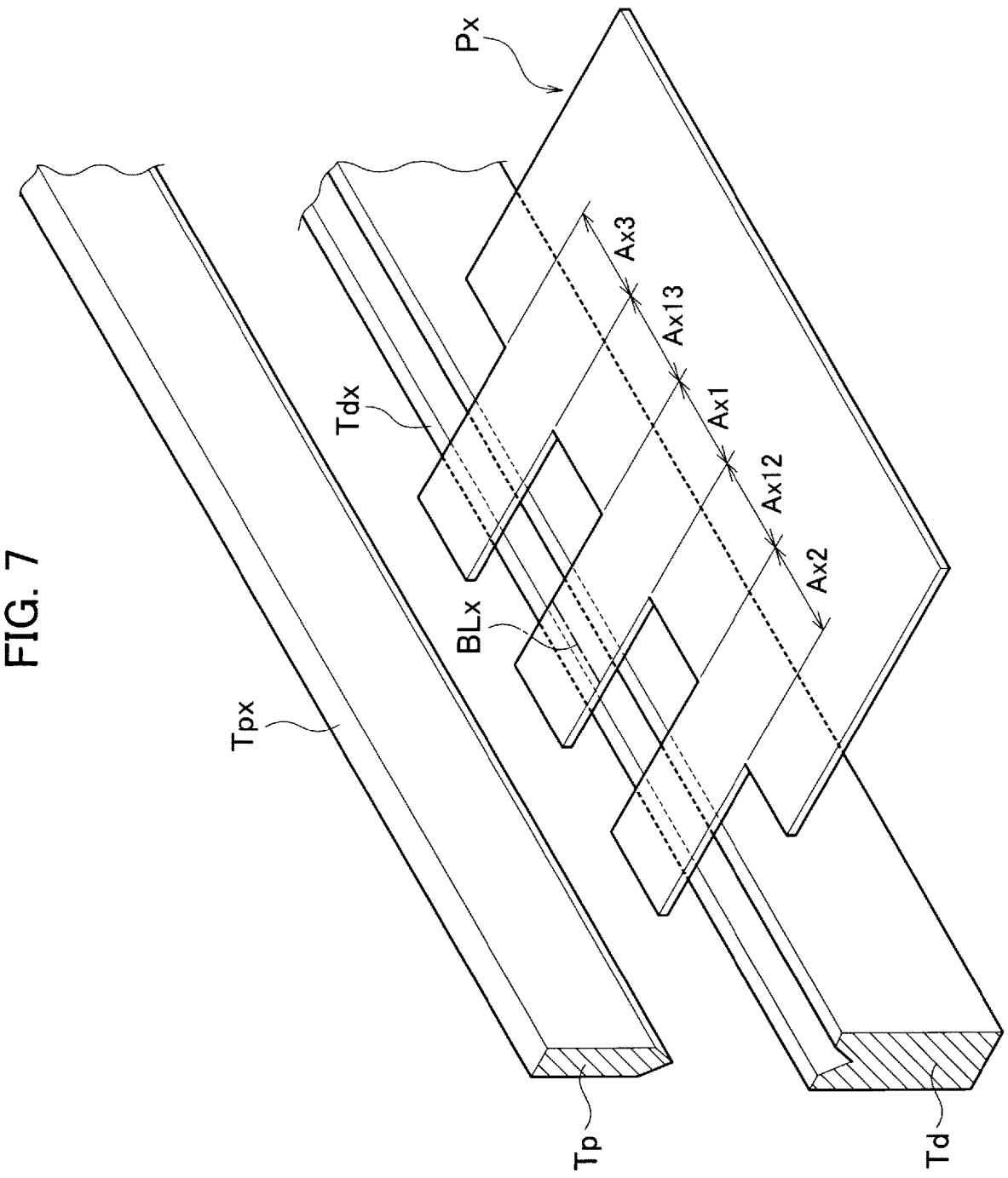
FIG. 7 is a perspective view illustrating a basic model of a process of calculating an interference region.

A basic model for the process of calculating the interference region will be described with reference to FIG. 7. A case in which a part Px of the basic model illustrated in FIG. 7 is bent along a bending line BLx of a bending region Ax1 is considered. The bending line BLx is assumed to be bent with a punch Tpx and a die Tdx which are tool models having an infinite length with the set tool name. At this time, when the part Px is bent along the bent line BLx, regions Ax2 and Ax3 interfere with the die Tdx. Therefore, the regions Ax2 and Ax3 are interference regions Ax2 and Ax3. Non-interference regions Ax12 and Ax13 are between the bending region Ax1, and the interference regions Ax2 and Ax3.

Figure 8:
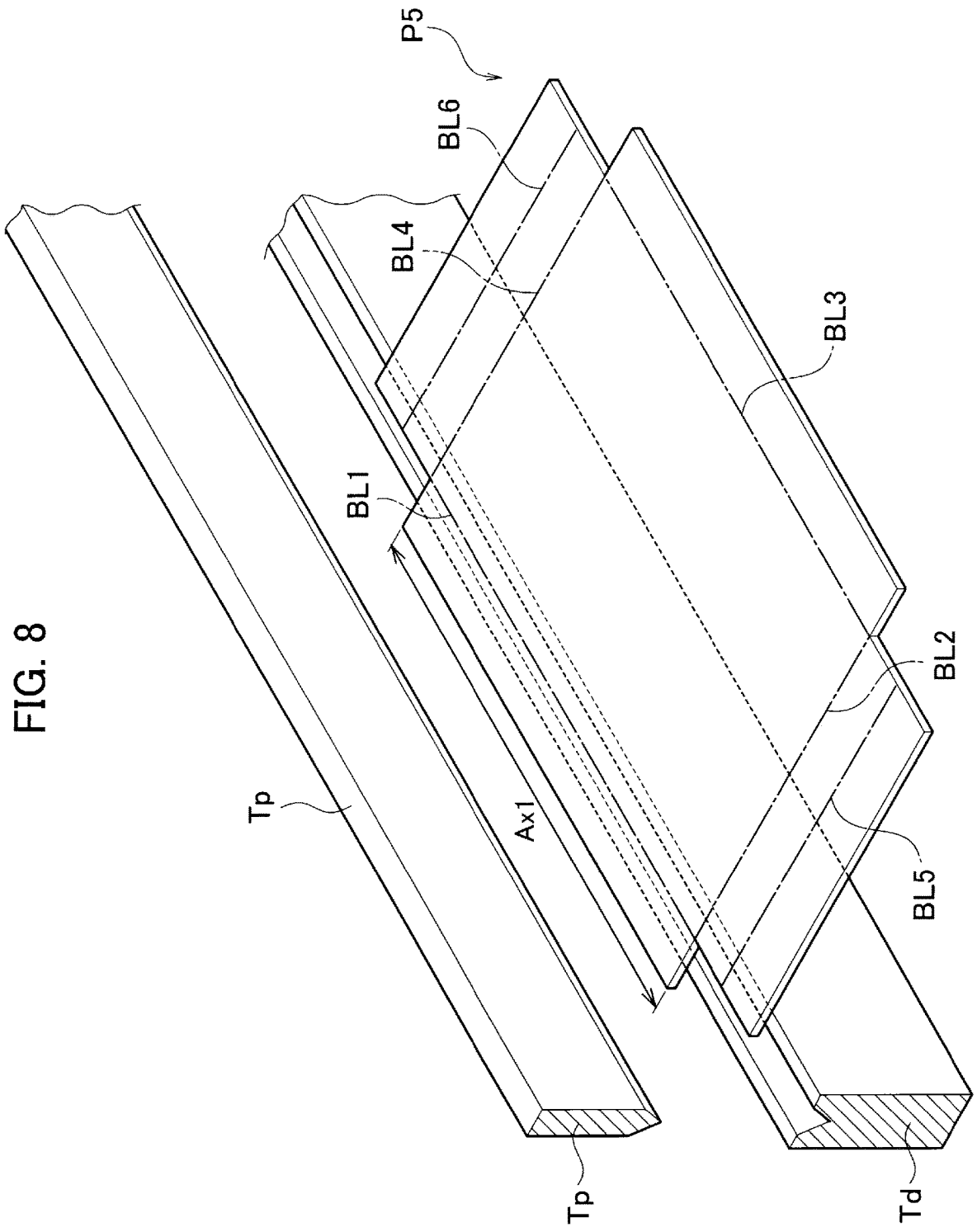
FIG. 8 is a perspective view illustrating a process of calculating an interference region when the part P5 illustrated in FIG. 5 is bent along a bending line BL1.

FIG. 8 illustrates a process of calculating an interference region when the bending line BL1 of the part P5 illustrated in FIG. 5 is bent. Tool models having an infinite length with the set tool name are assumed to be a punch Tp and a die Td. In FIG. 8, a range of the length of the bending line BL1 is the bending region Ax1 and there are no regions equivalent to the interference regions Ax2 and Ax3 and the non-interference regions Ax12 and Ax13. Lengths when there are no corresponding regions are expressed as "00000", for example. When the length of the bending line BL1 in FIG. 8 is 100 mm, for example, the lengths of the bending region Ax1, the interference regions Ax2 and Ax3, and the non-interference regions Ax12 and Ax13 can be expressed as 100, 00000, 00000, 00000, 00000, and 00000, respectively.

Figure 9:
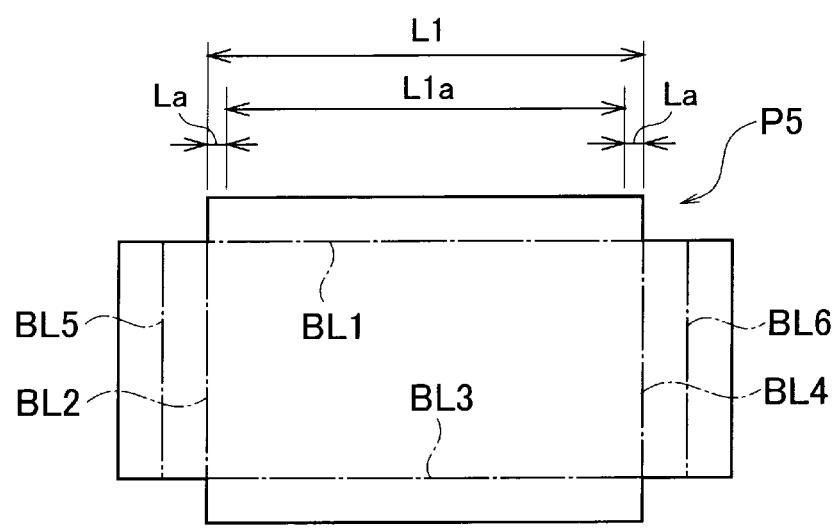
FIG. 9 is a plan view illustrating a shortest tool length in which the part P5 can be bent along the bending line BL1.

In step S7, the interference occurrence determination unit 105 determines whether interference occurs before or after the bending of the processing target part along the selected bending line with the tool models having the infinite length. In FIG. 9 it is preferable to bend the bending line BL1 using a tool having a length equal to or greater than the bending line BL1 when the bending line BL1 is bent. However, the bending line BL1 can be bent actually even when the length of the tool is shorter than the length of the bending line BL1. In FIG. 9, even a tool having a length shorter by an allowance length La at both ends of the bending line BL1 with L1 can bend the bending line BL1. Accordingly, a shortest tool length in which the bending line BL1 can be bent is a length L1a.

In step S7, the interference occurrence determination unit 105 determines whether there is a flange or the like formed before bending of the bending line BL1 and the flange interferes with the tool within the range of the length L1a. In FIG. 8, since there is no flange or the like formed before bending of the bending line BL1 and interference does not occur, it is determined that interference does not occur (NO), and the process proceeds to step S8. Note that when it is determined whether interference occurs, information regarding an angle at which the part is bent is required. The information regarding the angle at which a part is bent can be obtained from part data. The information regarding the angle at which a part is bent may be obtained from an attribute value of a bending line of topology data.

Figure 10A:
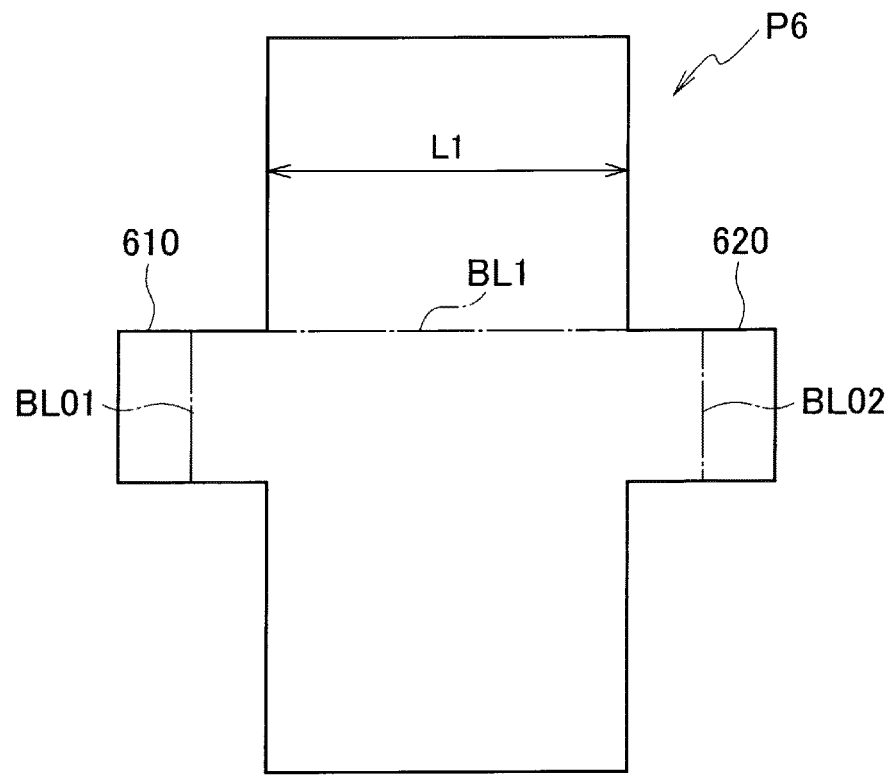
FIG. 10A is a plan view illustrating a part P6 with bending lines BL01, BL02, and BL1 before bending.
Figure 10B:
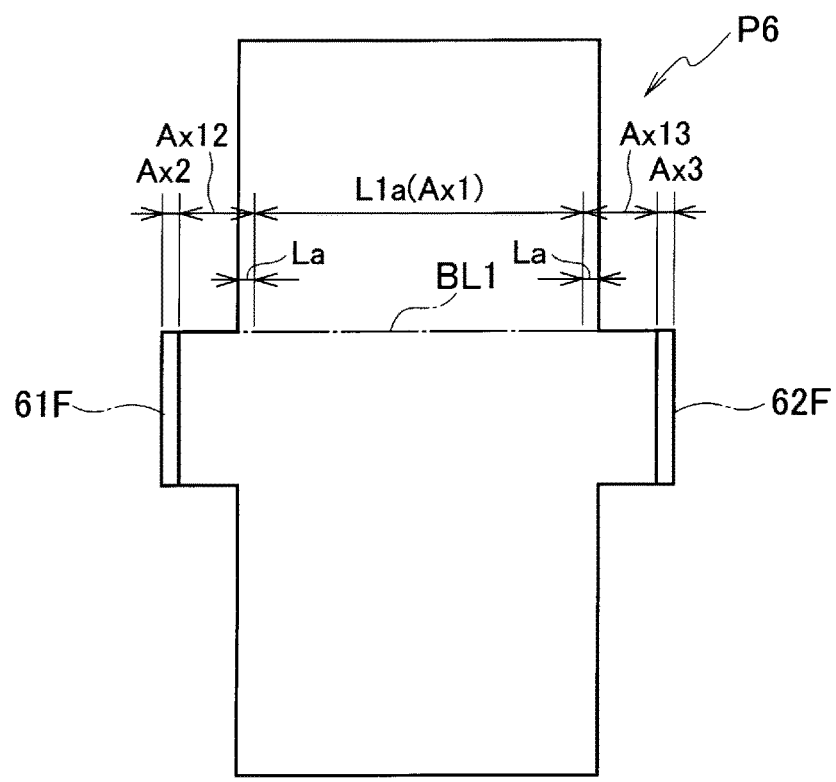
FIG. 10B is a plan view illustrating a state in which the part P6 illustrated in FIG. 10A is bent along the bending lines BL01 and BL02.
Figure 11A:
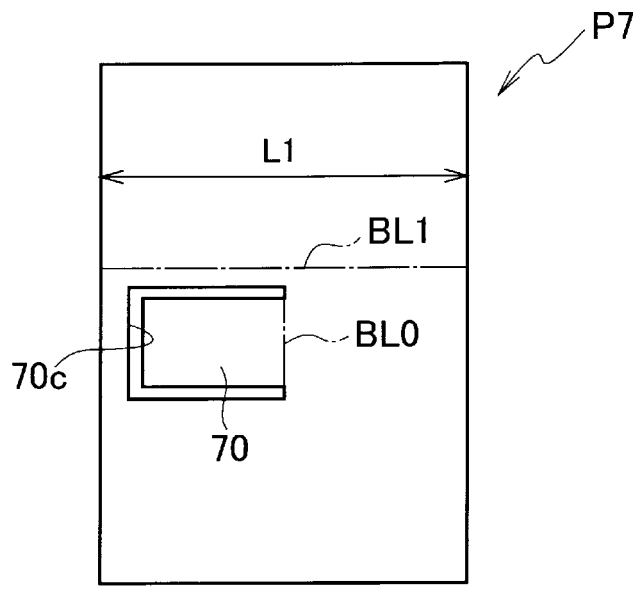
FIG. 11A is a plan view illustrating a part P7 with bending lines BL0 and BL1 before bending.
Figure 11B:
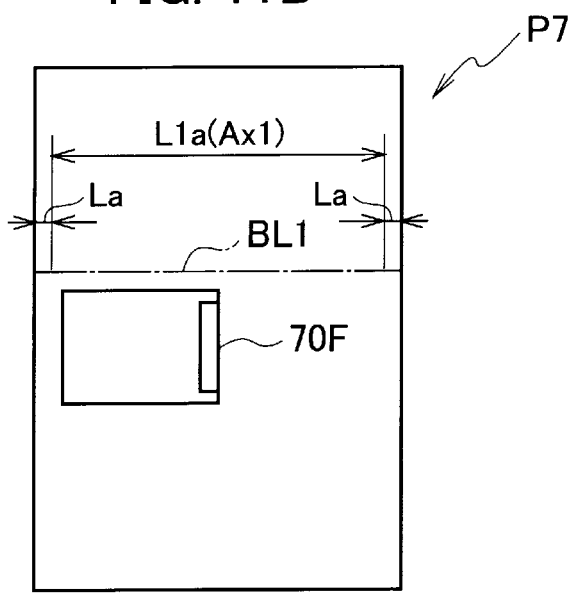
FIG. 11B is a plan view illustrating a state in which the part P7 illustrated in FIG. 11A is bent along a bending line BL0.

Here, the determination of whether the interference occurs in step S7 will be further described using a part P6 illustrated in FIGS. 10A and 10B and a part P7 illustrated in FIGS. 11A and 11B. In FIG. 10A, after left and right protrusions 610 and 620 of the part P6 are bent by 90 degrees along bending lines BL01 and BL02, the bending line BL1 having the length L1 can be bent. FIG. 10B illustrates a state in which the protrusions 610 and 620 are bent by 90 degrees along the bending lines BL01 and BL02. In the protrusions 610 and 620, flanges 61F and 62F bent along the bending lines BL01 and BL02 are formed.

Similar to FIG. 9, the length L1a shortened by the allowance length La from both ends of the length L1 can be set as a shortest tool length in which the bending line BL1 can be bent. In this case, the range of the length L1a is the bending region Ax1. When the part P6 is bent along the bending line BL1, the flanges 61F and 62F interfere with the tool model having the infinite length. Therefore, a range of a distance equivalent to a plate thickness of the flanges 61F and 62F is the interference regions Ax2 and Ax3. The non-interference regions Ax12 and Ax13 are between the bending region Ax1, and the interference regions Ax2 and Ax3.

In FIG. 10B, when the tool length is equal to or greater than the length L1a and is less than a length obtained by adding the lengths of the non-interference regions Ax12 and Ax13 to the length L1a at a maximum, the bending line BL1 can be bent without interference with the flanges 61F and 62F. Accordingly, when the processing target part is the part P6 and the selected bending line is the bending line BL1 illustrated in FIG. 10B, it is determined in step S7 that interference does not occur.

In FIG. 11A, a notch 70c is formed in the part P7. It is assumed that after a cut and raised piece 70 surrounded by the notch 70c is bent by 90 degrees along the bending line BL0 at the root of the cut and raised piece 70, the bending line BL1 having the length L1 is bent. FIG. 11B illustrates a state in which the cut and raised piece 70 are bent at 90 degrees along the bending line BL0. A flange 70F is formed by bending the cut and raised piece 70 by 90 degrees along the bending line BL0.

In FIG. 11B, the length L1a shortened by the allowance length La from both ends of the length L1 can also be set to a shortest tool length in which the bending line BL1 can be bent. In this case, the range of the length L1a is the bending region Ax1. In FIG. 11B, when the part P7 is bent along the bending line BL1, the flange 70F is in the bending region Ax1. Therefore, it is determined in step S7 that the interference occurs (YES). When it is determined in step S7 that the interference occurs, the process proceeds to step S10 of FIG. 6C.

Referring to FIG. 6B, in step S8, the tool determination unit 104 calculates the range of the tool length which can bend the selected bending line and which does not interfere with the part (a region other than the bending line), based on the interference region information. In the example illustrated in FIG. 8, the tool determination unit 104 can set a tool length equal to or greater than the length L1a as a tool length in which the bending line BL1 can be bent. Even when the tool length is lengthened in FIG. 8, interference does not occur. Therefore, the shortest tool length L1a or greater is defined as the range of the tool length in which the selected bending line can be bent and does not interfere with the part.

In addition, in step S8, the tool determination unit 104 determines the tool with the set tool name which has the tool length within the calculated range of the tool length as the use tool. At this time, the tool determination unit 104 selects a tool that has the tool length within the calculated range of the tool length among the tools managed by the tool management database 50. In the example of FIG. 8, the tool determination unit 104 selects a tool that has a length equal to or greater than the tool length L1a. When there are a plurality of tools which have tool lengths within the range of the tool length, the tool determination unit 104 selects the shortest tool.

In step S9, the interference occurrence determination unit 105 determines whether the part interferes with the tool at the time of bending the processing target part along the selected bending line using the determined use tool in the front direction or the rear direction designated with the tool front/back information. Normally, the tool is used in the front direction preferentially. When the processing information acquisition unit 103 does not acquire the tool front/back information, the interference occurrence determination unit 105 may determine whether the part interferes in the use tool in the front direction.

In FIG. 8, when the bending line BL1 is bent using the punch Tp and the Td of the use tool selected as described above instead of the punch Tp and the die Td having the infinite length, it is determined whether the part interferes with the tool. Here, it is determined that the part does not interfere with the punch Tp or the Die Td (NO). Accordingly, the tool correction unit 106 causes the process to proceed to step S16 of FIG. 6D without correcting the tool name and the tool front/back information of the use tool in the processing information.

In step S16, the butting position setting unit 107 sets butting positions with respect to the selected bending line. The butting position setting unit 107 can automatically set the butting positions in accordance with the length of the side or the shape of the side against which a pair of butts 601 are butted. The butting position setting unit 107 may use set values of the processing information of the similar part as the butting positions. Instead of the automatic setting of the butting positions by the butting position setting unit 107, the operator may set the butting positions.

Figure 12:
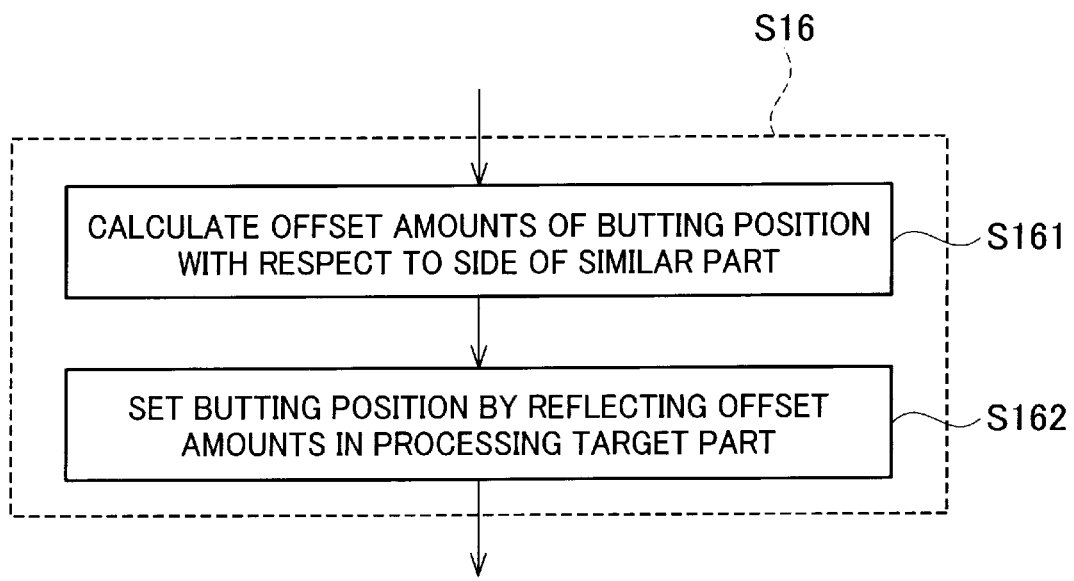
FIG. 12 is a flowchart illustrating an example of a specific process of step S16 illustrated in FIG. 6D.

Step S16 may be configured to include steps S161 and S162 illustrated in FIG. 12. In this case, the butting position setting unit 107 calculates offset amounts of the butting positions with respect to the side of the similar part in step S161, and sets the butting positions by reflecting the offset amounts in the processing target part in step S162. When step S16 is configured to include steps S161 and S162, the processing information necessarily includes positional information indicating where the pair of butts 601 is located in the width direction of the press brake.

Figure 13A:
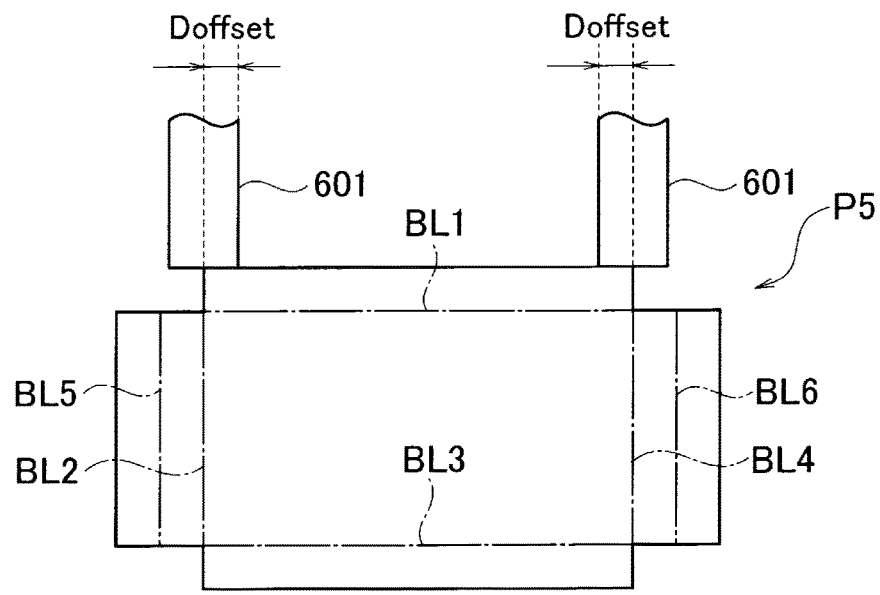
FIG. 13A is a plan view illustrating a state in which an offset amount of a butting position of a similar part P1 is reflected in the butting position of the processing target part P5.
Figure 13B:
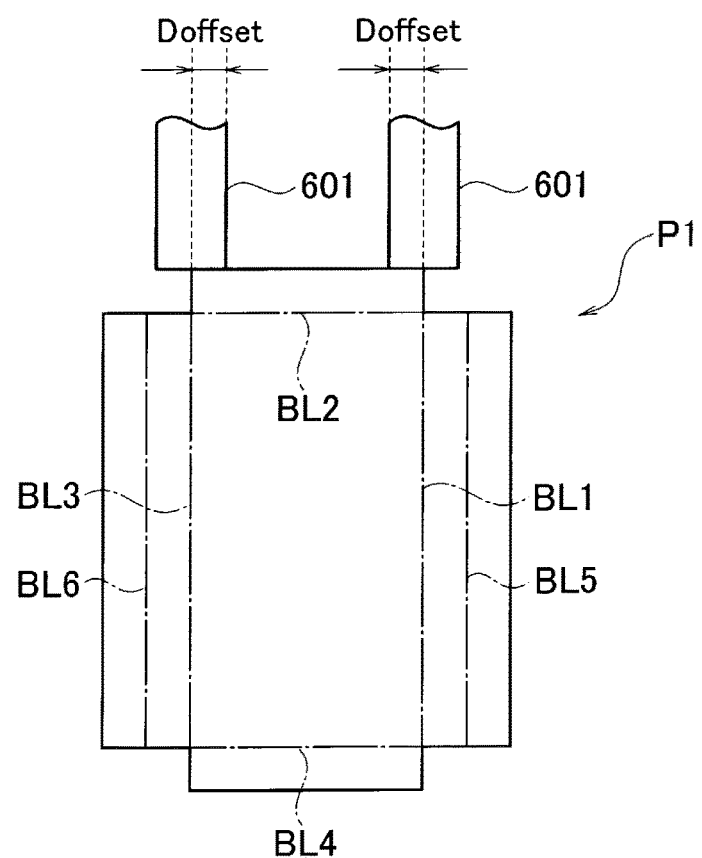
FIG. 13B is a plan view illustrating an offset amount of the butting position of the similar part P1.

The side against which the butts 601 are butted at the time of bending the bending line BL1 of the part P5 in FIG. 13A is equivalent to a side against which the butts 601 are butted at the time of bending the bending line BL2 (or BL4) of the part P1 in FIG. 13B. Offset amounts Doffset at the butting positions with respect to the side of the part P1 are assumed to be distances illustrated in FIG. 13B. The offset amounts Doffset are distances from the inside ends of the pair of butts 601 to the end of the side.

As illustrated in FIG. 13A, the butting position setting unit 107 also sets the butting positions to positions at which the pair of butts 601 are offset by the offset amounts Doffset when the bending line BL1 of the part P5 is bent. The butting position setting unit 107 may acquire the offset amounts Doffset from set values (user parameters) set by the operator.

Figure 6D:
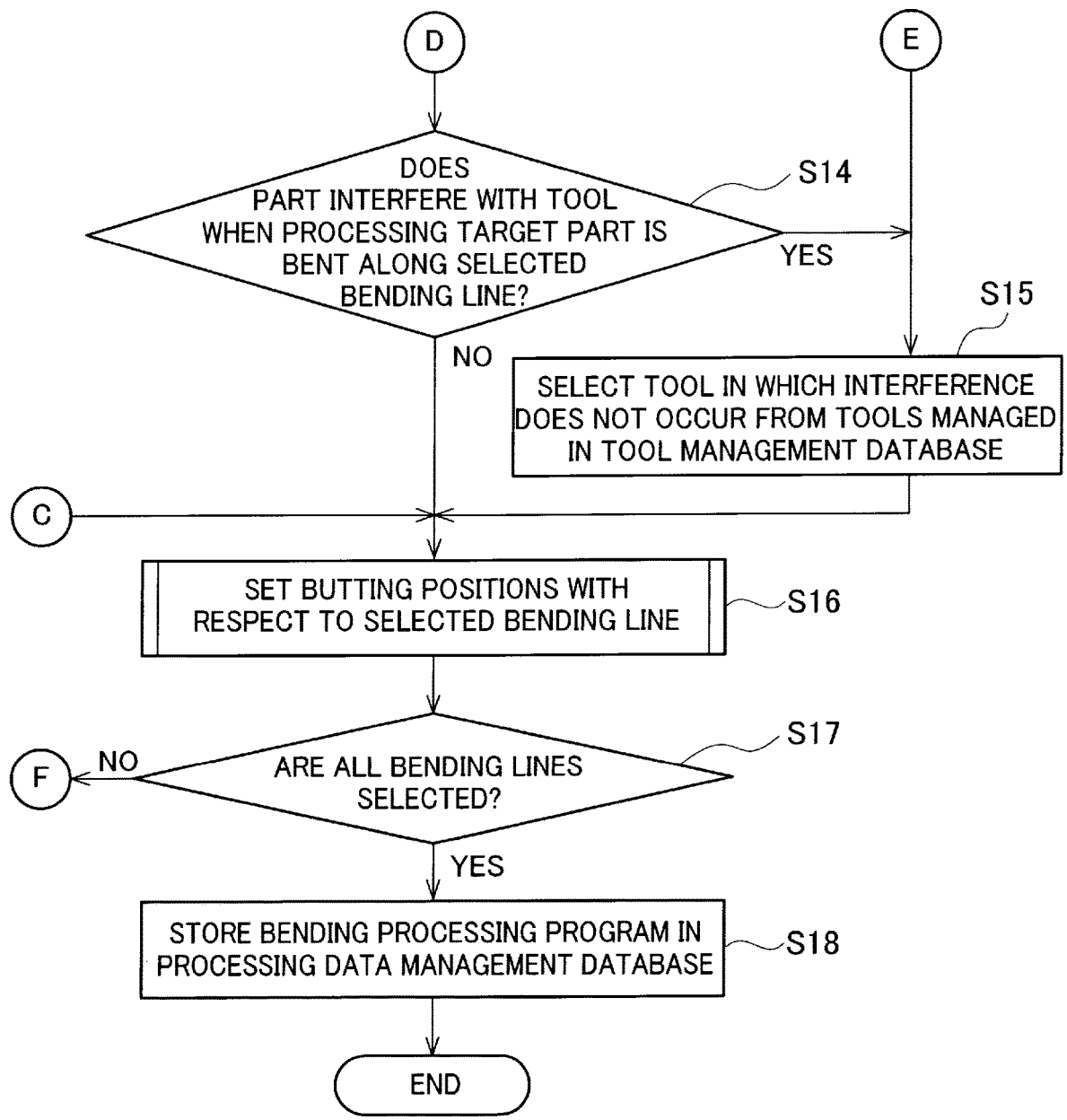
FIG. 6D is a partial flowchart illustrating a process performed by the processing program creation device according to one or more embodiments, and a processing program creation method according to one or more embodiments following the flowchart of FIG. 6C.

Referring to FIG. 6D, in step S17, the tool determination unit 104 determines whether all the bending lines are selected. When all the bending lines are not selected (NO), the tool determination unit 104 returns the process to step S5.

Similarly after the bending line BL2, the processing program creation device 10 calculates the range of the tool length which can bend each bending line, and which does not interfere with the part, and determines the tool as the use tool having the tool length within the calculated range of the tool length.

Figure 14A:
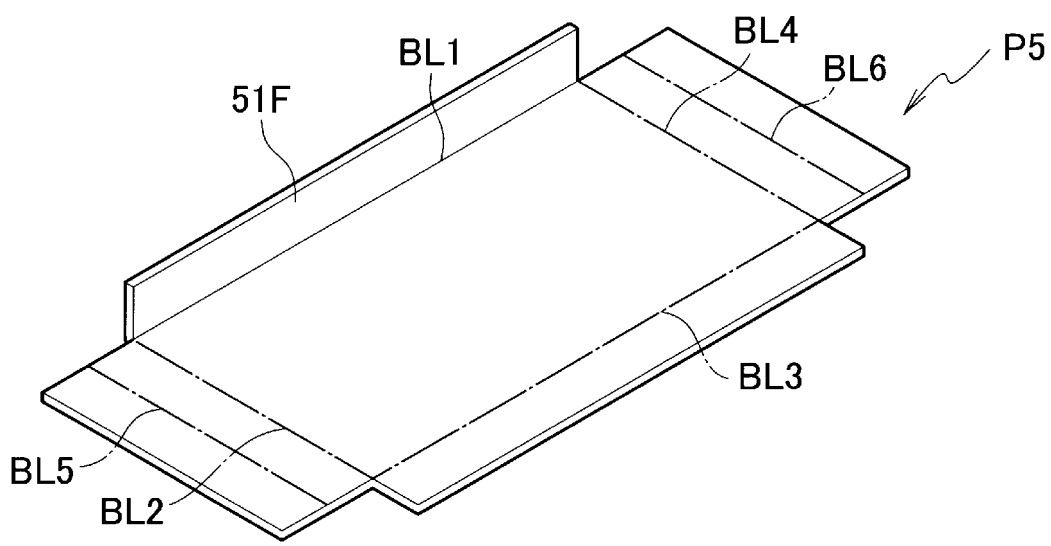
FIG. 14A is a perspective view illustrating a state in which the part P5 illustrated in FIG. 5 is bent along the bending line BL.
Figure 14B:
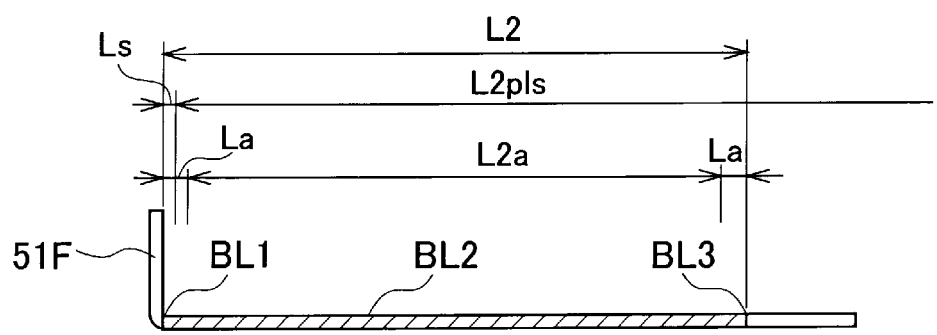
FIG. 14B is a sectional view illustrating a tool length when the part P5 illustrated in FIG. 14A is bent along a bending line BL2.

FIG. 14A illustrates a state in which a flange 51F is formed by bending the part P5 along the bending line BL1. When the bending line BL2 of the subsequent order is bent, the range of the tool length is illustrated in FIG. 14B. FIG. 14B is a sectional view illustrating the part P5 in FIG. 14A taken along the bending line BL2. In FIG. 14B, L2 is a length of the bending line BL2. There is an inside R in the portion of the bent bending line BL2. Accordingly, a position away to avoid the inside R from the inner surface of the flange 51F by a distance Ls is an end closest to the flange F1 in the range of the tool length. The range of the tool length can extend in the opposite direction of the bending line BL2 to the flange 51F without limit. Accordingly, a range L2pls can be set as the range of the tool length.

Similar to FIG. 9, a length L2a shortened by the allowance length La from both ends of the length L2 can be set as the shortest tool length in which the bending line BL2 can be bent.

Figure 15A:
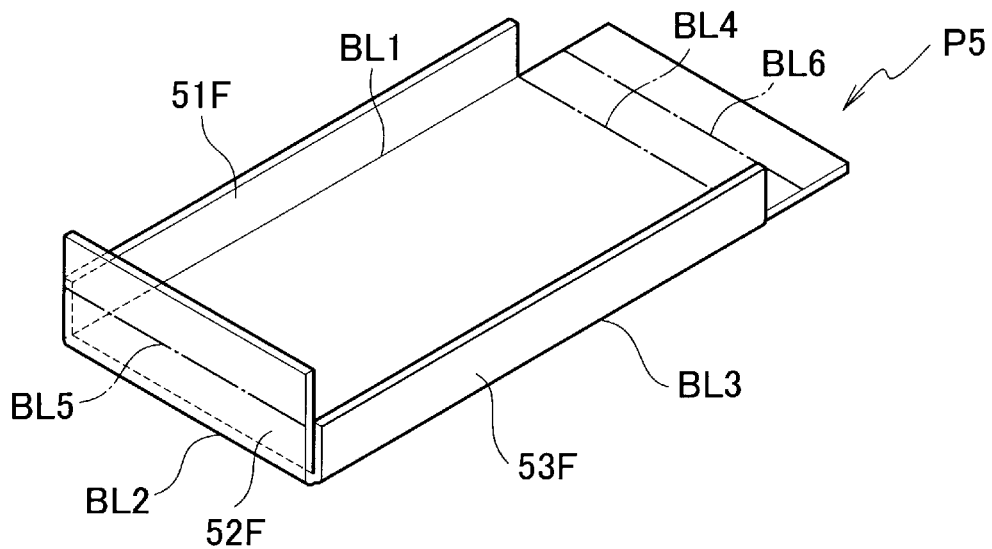
FIG. 15A is a perspective view illustrating a state in which the part P5 illustrated in FIG. 5 is bent along the bending lines BL1 to BL3.
Figure 15B:
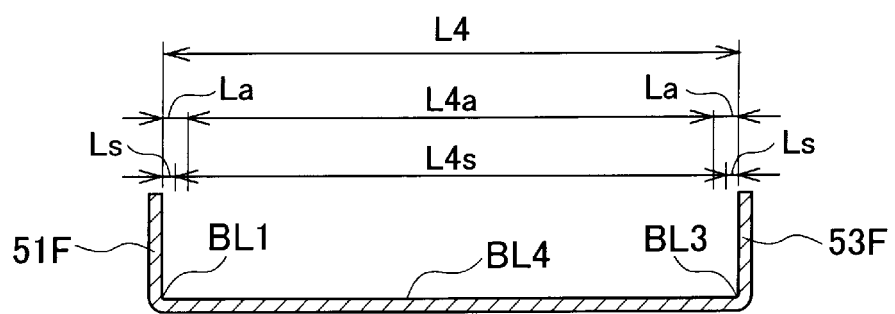
FIG. 15B is a sectional view illustrating a tool length when the part P5 illustrated in FIG. 15A is bent along a bending line BL4.

FIG. 15A illustrates a state in which the flanges 51F, 52F, and 53F are formed by bending the part P5 along the bending lines BL1 to BL3. When the bending line BL4 of the subsequent order is bent, the range of the tool length is illustrated in FIG. 15B. FIG. 15B is a sectional view illustrating the part P5 in FIG. 15A taken between the bending lines BL2 and BL4. A length L4s shortened by a distance Ls from each inner surface of the flanges 51F and 53F can be set as a longest tool length in which the bending line BL4 can be bent. A length L4a shortened by the allowance length La from each inner surface of the flanges F1 and F3 can be set as a shortest tool length in which the bending line BL2 can be bent. The bending order illustrated in FIG. 15A is given as an example. As another example, the order of the bending lines BL5, BL2, BL6, BL4, BL1, and BL3 can be set as the bending order.

When all the bending lines are selected in step S17 (YES), the bending processing program creation unit 108 creates the bending processing program and stores the bending processing program in the processing data management database 20 in step S18, and then ends the process. The bending processing program creation unit 108 can create the bending processing program based on the tool information acquired from the tool management database 50, the processing information acquired by the processing information acquisition unit 103 or the corrected processing information generated by the tool correction unit 106, as will be described below, the tool length determined by the tool determination unit 104, and the butting positions set by the butting position setting unit 107.

For a part different from the part P5 described above, it is determined in step S9 that the part interferes with the tool in some cases. When the part interferes with the tool in step S9 (YES) in FIG. 6B, the tool determination unit 104 reveres the front and back of the tool model having the infinite length of the tool with the set tool name in step S10 of FIG. 6C. The same applies to the case in which it is determined in step S7 that the interference occurs and the process proceeds to step S10.

In step S11, the tool determination unit 104 performs a process of calculating an interference region using the tool model having the infinite length of which the front and back are reversed. The process of calculating the interference region in step S11 is similar to the process of calculating the interference region in step S6. In step S12, the interference occurrence determination unit 105 determines whether interference occurs before or after bending of the processing target part along the selected bending line using the tool model having the infinite length. The determination process of step S12 is similar to the determination process of step S7.

When it is determined in step S12 that the interference occurs (YES), the tool determination unit 104 causes the process to proceed to step S15 of FIG. 6D. A process of step S15 will be described later.

When it is determined in step S12 that interference does not occur (NO), in step S13, the tool determination unit 104 calculates the range of the tool length which can bend the selected bending line and which does not interfere with the part, based on the interference region information. In step S13, the tool determination unit 104 also determines the tool with the set tool name which has the tool length within the calculated range of the tool length as the use tool. The process of calculating the range of the tool length and the process of determining the use tool in step S13 are similar to the process of calculating the range of the tool length and the process of determining the use tool in step S8.

The reason why steps S11 to S13 similar to steps S6 to S8 are performed after the front and back of the tool model are reversed in step S10 is that the cross section at the time of cutting the tool in the front and rear directions of the press brake is not symmetrical in the front and rear directions. When the front and back of the use tool are reversed, a situation of the interference between the part and the tool is changed in some cases. In particular, when a standard punch and a gooseneck punch are used as the use tool, a situation of interference is considerably changed.

The interference occurrence determination unit 105 determines whether the part interferes with the tool when the processing target part is bent along the selected bending line using the reversed front and back of the use tool in step S14 of FIG. 6D. As described above, when the processing information acquisition unit 103 does not acquire the tool front/back information, the interference occurrence determination unit 105 determines in step S9 whether the use tool interferes in the front direction. Therefore, it may be determined in step S14 whether the use tool interferes in the back direction.

Figure 16A:
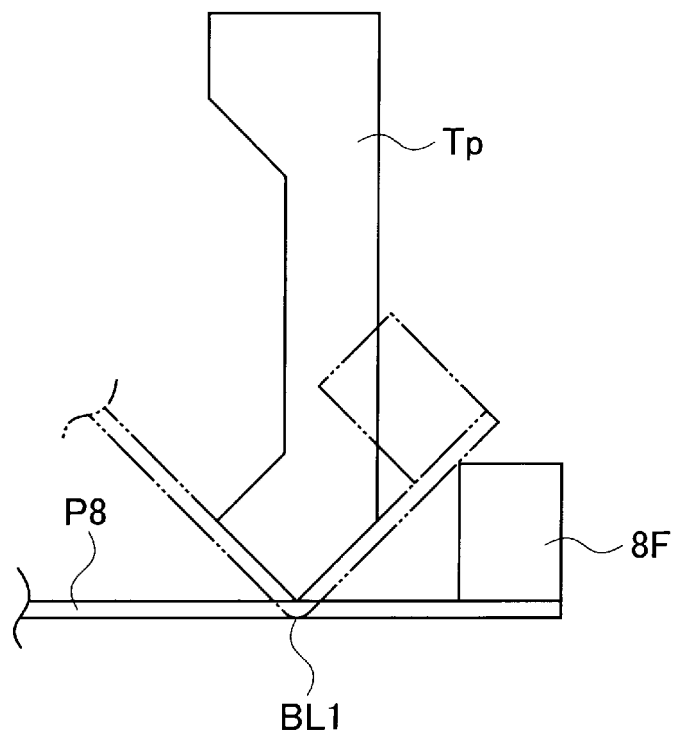
FIG. 16A is a conceptual diagram illustrating interference of a flange formed in a part P8 in a tool after bending processing of the part P8 starts.

An example in which interference between a part and a tool is eliminated only reversing the front and back of the tool in step S10 will be described with reference to FIGS. 16A and 16B. In FIG. 16A, the punch Tp is mounted in the front direction on an unillustrated upper table. A part P8 has a flange 8F. When the part P8 is bent along the bending line BL1, interference between the flange 8F and the punch Tp occurs.

Figure 16B:
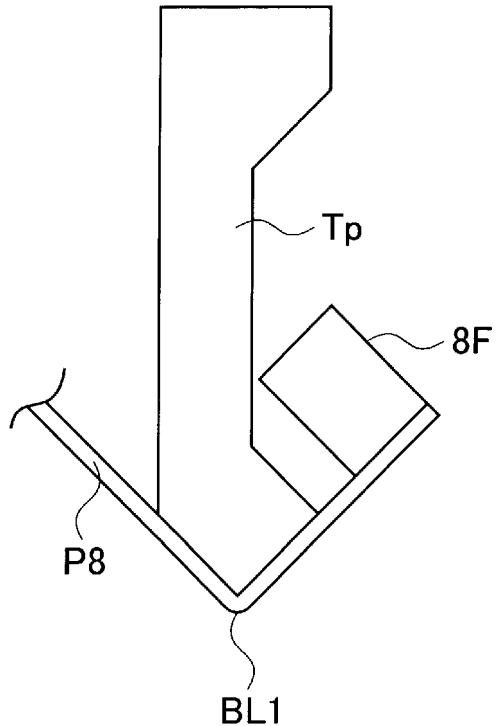
FIG. 16B is a partial side view illustrating a state in which the interference of the flange in the tool is eliminated by reversing of the front and back of the tool in FIG. 16A and the part P8 is subjected to bending processing.

As illustrated in FIG. 16B, when the front and back of the punch Tp are reversed and the punch Tp is mounted in the back direction on the upper table, the interference between the flange 8F and the punch Tp does not occur, and the interference is eliminated. Accordingly, in the case of FIG. 16A, the interference occurrence determination unit 105 determines in step S14 that interference does not occur (NO). Therefore, the tool length is determined using the punch Tp in the state in which the front and back of the punch Tp are reversed. At this time, the tool correction unit 106 generates corrected processing information in which the tool front/back information of the processing information is substituted with tool front/back information obtained by reversing the front and back.

Figure 17A:
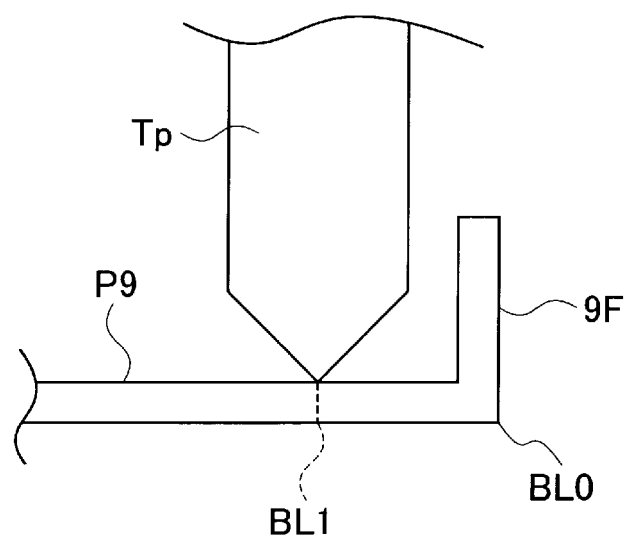
FIG. 17A is a partial side view illustrating a state before a part P9 with a flange is bent.
Figure 17B:
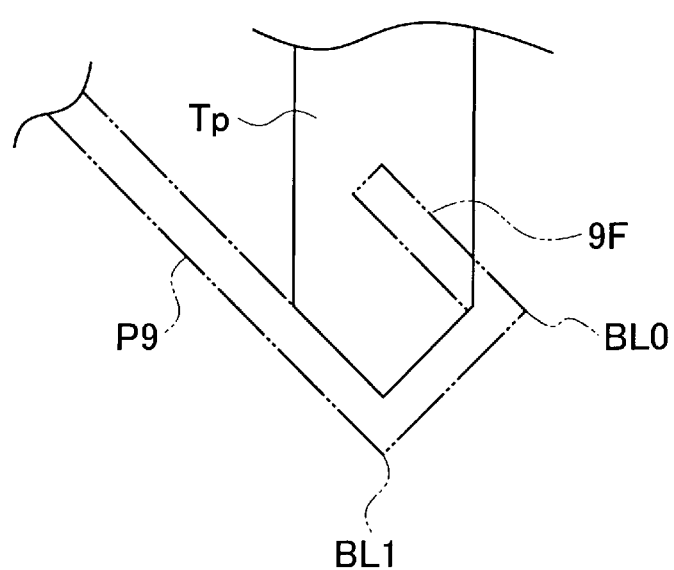
FIG. 17B is a conceptual diagram illustrating a state in which the flange interferes in the tool after the bending processing of the part P9 illustrated in FIG. 17A starts, and the interference between the flange and the tool is not eliminated even when the front and back of the tool is reversed.

An example in which interference between a part and a tool is not eliminated with only reversing of the front and back of the tool in step S10 will be described with reference to FIGS. 17A and 17B. In FIG. 17A, the punch Tp is mounted in the front direction on an unillustrated upper table. A part P9 has a flange 9F formed by bending the bending line BL0. As illustrated in FIG. 17B, when the part P9 is bent along the bending line BL1, interference between the flange 9F and the punch Tp occurs.

With the punch Tp illustrated in FIGS. 17A and 17B, the interference between the flange 9F and the punch Tp is not eliminated even when the front and back of the punch Tp are reversed. Accordingly, in the case of FIG. 17A, the interference occurrence determination unit 105 determines in step S14 that the interference occurs (YES) and the process proceeds to step S15. In step S15, the tool correction unit 106 selects a substitute tool which is a tool in which interference does not occur from the tools managed in the tool management database 50, generates corrected processing information in which the tool name of the use tool is substituted with a tool name of the substitute tool, and causes the process to proceed to step S16. The same applies to a case in which it is determined in step S12 that interference occurs and the process proceeds to step S15.

In step S15, the tool correction unit 106 may select another tool irrespective of the type of tool set before step S13. The tool correction unit 106 may select the die Td with a narrower V width or the die Td with a broader V width which does not interfere in a part when a substitute tool of the die Td is selected. The tool correction unit 106 may select a V width irrespective of the V width of the die Td set before step S13. The tool correction unit 106 may select a tool which does not interfere with a burring present in a part when the burring interferes in the tool.

As described above, the bending processing program creation unit 108 determines a tool used at the time of performing bending processing on each bending line of the processing target part (the use tool) based on the tool name included in the processing information or the corrected processing information and the tool length determined by the tool determination unit 104. The bending processing program creation unit 108 selects the use tool from the tools managed in the tool management database 50 and creates the bending processing program.

When the tool correction unit 106 generates the corrected processing information in which the front and back of the tool are reversed, the bending processing program creation unit 108 creates the bending processing program by reversing the front and back of the use tool. When the tool correction unit 106 generates the corrected processing information changed for the substitute tool, the bending processing program creation unit 108 creates the bending processing program by selecting the substitute tool from the tools managed in the tool management database 50.

In some cases, the tool correction unit 106 reverses the front and back of only the punch Tp, reverses the front and back of only the die Td, or reverses the fronts and backs of the punch Tp and the die Td. In some cases, the tool correction unit 106 selects a substitute tool of only the punch Tp, selects a substitute tool of only the die Td, or selects a substitute tool of both the punch Tp and the die Td.

The tool actually used in the bending processing program is a tool in which interference between a region other than the bending region Ax1 of the part and the tool does not occur when each bending line is subjected to bending processing, as described above. The region other than the bending region Ax1 of the part are the interference regions Ax2 and Ax3 which is on an extension line of a bending line, a flange formed through the bending processing in the immediately previous bending order, or the like. In the tool actually used in the bending processing program, the front and back of the tool are set so that interference between a part and the tool does not occur. Accordingly, the processing program creation device 10 can actually perform the bending processing on a part with reference to a bending processing program of a similar part selected based on the topology data.

Incidentally, there are a plurality of similar parts that have the same topology data as the topology data of the processing target part in step S2 of FIG. 6A in some cases. In this case, the processing program creation device 10 may display the plurality of similar parts on the display 11 and an owner (or an operator) of the press brake may select any similar part. The processing program creation device 10 may automatically select a similar part with the highest similarity.

Moreover, in a plurality of parts that have the same topology data, a plurality of pieces of processing information in which at least one of the tool name of the use tool, the tool front/back information, the bending order, and the butting direction is different are set in some cases. In this case, the processing program creation device 10 may select the processing information in a predetermined priority order. It is preferable that the processing program creation device 10 acquires processing information of the bending processing program for performing bending processing using a press brake selected by the processing program creation device 10 with the highest priority (first priority). The processing program creation device 10 may select a press brake in alphabet letter order of machine names of press brakes and acquire processing information of the bending processing program for performing bending processing using the selected press brake with the second priority.

Furthermore, the processing program creation device 10 may set priority in machine names and acquire processing information of the bending processing program according to the priority.

The present invention is not limited to one or more embodiments described above, and various modifications can be made within the scope of the present invention without departing from the scope of the present invention. Depending on a shape of a part and a method of bending the part, the interference between the part and a tool does not occur before or after bending processing of the part starts. In this case, it is sufficient for the tool determination unit 104 to determine a tool length which can bend the bending line in each bending step and which does not interfere with a region other than the bending region Ax1. The tool correction unit 106 may not necessarily generate the corrected processing information in which the front and back of the tool are reversed or generate the corrected processing information in which the tool name is substituted with the tool name of a substitute tool. Accordingly, providing the tool correction unit 106 is not essential.

When the tool correction unit 106 is provided, bending processing can be performed on a part by reversing the front and back of the tool, or selecting a substitute tool even in a case in which interference between the part and the tool occurs before or after the bending processing on the part starts. Accordingly, it is preferable to provide the tool correction unit 106.

This application is based upon and claims the benefit of priority from Indian Patent Application No. 201941038166 filed on Sep. 21, 2019, the entire contents of which are incorporated herein by reference.

The invention claimed is:

1. A processing program creation device by a computing device, in which a topology database is configured: to generate topology data indicating a geometric relationship between surfaces or bending lines of each part of a plurality of parts stored in a processing data management database; to acquire processing information including a tool name of a use tool used to perform bending processing on each bending line of a plurality of bending lines of each of the parts, tool front/back information for designating whether to use the use tool in a front direction or a back direction, and a bending order in which the plurality of bending lines are subjected to the bending processing from a bending processing program stored in the processing data management database and used for the bending processing on each of the parts; and to store the processing information in association with topology data of each of the parts, the processing program creation device comprising:
   a processing information acquisition unit configured to search for a similar part with same topology data as topology data of a processing target part from the topology database, and to acquire the processing information of the similar part;
   a tool determination unit configured to calculate a range of a tool length which is able to bend each bending line of a plurality of bending lines of the processing target part using a tool with a tool name included in the processing information acquired by the processing information acquisition unit, which does not interfere with the part, and to determine the tool with the tool name and a tool length within a range of the tool length as the use tool;
   an interference occurrence determination unit configured to determine whether interference between the part and the tool occurs before or after bending of the processing target part along each of the bending lines;
   a tool correction unit configured to reverse a front and back of the use tool determined by the tool determination unit as a front/back designated by the tool front/back information of the processing information, so that the interference between the part and the tool is eliminated when the interference occurrence determination unit determines that the interference between the part and the tool occurs before or after the bending of the part along any bending line, and to select, as a substitute tool, a tool other than the use tool determined by the tool determination unit so that the interference between the part and the tool is eliminated when it is determined that the interference between the part and the tool is not eliminated even in the reversing of the front and back of the use tool; and
   a bending processing program creation unit configured to create a bending processing program for performing the bending processing on the plurality of bending lines in a bending order included in the processing information acquired by the processing information acquisition unit using the use tool determined by the tool determination unit, to create the bending processing program based on the reversed use tool when the front and back of the use tool is reversed, and to create the bending processing program based on the substitute tool selected by the tool correction unit when the tool other than the use tool is selected,
   wherein in a case where there are a plurality of similar parts with same topology data as the topology data of the processing target part in the topology database, the processing information acquisition unit is configured to select processing information in a predetermined priority order to acquire the processing information of the similar part.

2. The processing program creation device according to claim 1, wherein
   the processing information stored in the topology database further includes a butting direction in which a butt of a back gauge is butted against each of the parts when each bending line is subjected to the bending processing, and
   the bending processing program creation unit creates the bending processing program based on the butting direction included in the processing information.

3. The processing program creation device according to claim 1, further comprising:
   a butting position setting unit configured to set a butting position at which a butt of a back gauge is butted against the processing target part when each bending line of the processing target part is subjected to the bending processing,
   wherein the bending processing program creation unit creates the bending processing program based on the butting position set by the butting position setting unit.

4. The processing program creation device according to claim 3, wherein
   the butting position setting unit calculates an offset amount of the butting position of the butt against a side of the processing target part based on an offset amount of the butting position of the butt against a side of the similar part, or acquires the offset amount from a user parameter, and
   the bending processing program creation unit creates the bending processing program based on the offset amount calculated or acquired by the butting position setting unit.

5. A processing program creation method in which a topology database: generates topology data indicating a geometric relationship between surfaces or bending lines of each part of a plurality of parts stored in a processing data management database; acquires processing information including a tool name of a use tool used to perform bending processing on each bending line of a plurality of bending lines of each of the parts, tool front/back information for designating whether to use the tool in a front direction or a back direction, and a bending order in which the plurality of bending lines are subjected to the bending processing by a bending processing program stored in the processing data management database and used for the bending processing on each of the parts; and stores the processing information in association with topology data of each of the parts, by means of a computing device, searching for a similar part with the same topology data as topology data of a processing target part from the topology database, and acquiring the processing information of the similar part;

calculating a range of a tool length which is able to bend each bending line of a plurality of bending lines of the processing target part using a tool with a tool name included in the processing information acquired by the processing information acquisition unit, and which does not interfere with the part, and determining the tool with the tool name and a tool length within a range of the tool length as the use tool;

determining whether interference between the part and the tool occurs before or after bending of the processing target part along each of the bending lines;

reversing a front and back of the use tool as a front/back designated by the tool front/back information of the processing information, so that the interference between the part and the tool is eliminated when the computing device determines that the interference between the part and the tool occurs before or after the bending of the part along any bending line;

selecting, as a substitute tool, a tool other than the determined use tool so that the interference between the part and the tool is eliminated when it is determined that the interference between the part and the tool is not eliminated even in the reversing of the front and back of the use tool;

creating a bending processing program for performing the bending processing on the plurality of bending lines in a bending order included in the processing information using the determined use tool;

creating the bending processing program based on the reversed use tool when the front and back of the use tool is reversed;

creating the bending processing program based on the selected substitute tool unit when the tool other than the use tool is selected; and selecting processing information in a predetermined priority order to acquire the processing information of the similar part, in a case where there are a plurality of similar parts with same topology data as the topology data of the processing target part in the topology database.

6. The processing program creation method according to claim 5, wherein the processing information stored by the topology database further includes a butting direction in which a butt of a back gauge is butted against each of the parts when each bending line is subjected to the bending processing, and by means of the computing device, creating the bending processing program based on the butting direction included in the processing information.

7. The processing program creation method according to claim 5, wherein by means of the computing device, setting a butting position at which a butt of a back gauge is butted against the processing target part when each bending line of the processing target part is subjected to the bending processing; and creating the bending processing program based on the set butting position.

8. The processing program creation method according to claim 7, wherein by means of the computing device, calculating an offset amount of the butting position of the butt against a side of the processing target part based on an offset amount of the butting position of the butt against a side of the similar part, or acquiring the offset amount from a user parameter; and creating the bending processing program based on the calculated or acquired offset amount.

\* \* \* \* \*